wu et al.

(12) United States Patent
Wu et al.

(10) Patent No.: US 11,368,995 B2
(45) Date of Patent: Jun. 21, 2022

(54) CELL GROUPING FOR BEAM MANAGEMENT (71) Applicant: Nokia Technologies Oy, Espoo (FI)

(72) Inventors: Chunli Wu, Beijing (CN); Benoist Sebire, Tokyo (JP); Samuli Turtinen, Li (FI); Timo Koskela, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/979,201

(22) PCT Filed: Apr. 13, 2018

(86) PCT No.: PCT/CN2018/083097
§ 371 (c)(1),
(2) Date: Sep. 9, 2020

(87) PCT Pub. No.: WO2019/196118
PCT Pub. Date: Oct. 17, 2019

(65) Prior Publication Data
US 2020/0413469 A1 Dec. 31, 2020

(51) Int. Cl.
H04W 76/19 (2018.01)
H04W 16/28 (2009.01)
(Continued)

(52) U.S. Cl.
CPC .......... H04W 76/19 (2018.02); H04B 7/0695 (2013.01); H04W 16/28 (2013.01);
(Continued)

(58) Field of Classification Search
CPC . H04W 76/19; H04W 16/28; H04W 36/0061; H04W 36/06; H04W 36/305;
(Continued)

(56) References Cited

U.S. PATENT DOCUMENTS

2015/0117183 A1    4/2015 Heo et al.
2020/0120584 A1*  4/2020 Yi ......................... H04L 5/0053
(Continued)

FOREIGN PATENT DOCUMENTS

CN    107567038 A    1/2018
WO    2016/017715 A1  2/2016
(Continued)

OTHER PUBLICATIONS

Office action received for corresponding Indian Patent Application No. 202047048376, dated Aug. 30, 2021, 4 pages.
(Continued)

Primary Examiner — Kevin C. Harper
Assistant Examiner — Derrick V Rose
(74) Attorney, Agent, or Firm — Squire Patton Boggs (US) LLP (57) ABSTRACT In accordance with an embodiment, a method may include determining, by a user equipment, a beam management group comprising one or more serving cells. The method may further include detecting, by the user equipment, a beam failure on at least one serving cell of the beam management group. The method may further include transmitting, by the user equipment, a beam failure recovery request to the at least one serving cell of the beam management group.

15 Claims, 6 Drawing Sheets

Cross Carrier Spatial QCL assumption for Downlink Reference signals (51) Int. Cl.
  *H04W 76/18* (2018.01)
  *H04W 36/30* (2009.01)
  *H04B 7/06* (2006.01)
  *H04W 36/00* (2009.01)
  *H04W 36/06* (2009.01)

(52) U.S. Cl.
  CPC ....... *H04W 36/0061* (2013.01); *H04W 36/06* (2013.01); *H04W 36/305* (2018.08); *H04W 76/18* (2018.02)

(58) Field of Classification Search
  CPC . H04W 76/18; H04W 24/04; H04W 74/0833; H04B 7/0695; H04B 7/0602
  See application file for complete search history.

(56) References Cited

U.S. PATENT DOCUMENTS

| | | | | |
|---|---|---|---|---|
| 2020/0404638 | A1* | 12/2020 | Deogun | H04L 5/0091 |
| 2021/0068162 | A1* | 3/2021 | Agiwal | H04L 41/0668 |

FOREIGN PATENT DOCUMENTS

| | | |
|---|---|---|
| WO | 2017/024516 A1 | 2/2017 |
| WO | 2018/027904 A1 | 2/2018 |
| WO | 2020/205130 A1 | 10/2020 |

OTHER PUBLICATIONS

Office action received for corresponding Korean Patent Application No. 2020-7032731, dated Jul. 23, 2021, 7 pages of office action and 3 pages of Translation available.
"UL transmissions when detecting beam failure", 3GPP TSG-RAN WG2 #101bis, R2-1805339, Agenda item: 10.3.1.4.2, Lenovo, Apr. 16-20, 2018, 2 pages.
"Offline Summary for Remaing issues on Beam Failure Recovery", 3GPP TSG RAN WG1 Meeting #AH1801, R1-1801197, Agenda Item: 7.2.2.4, MediaTek Inc., Jan. 22-26, 2018, 10 pages.
"Miscellaneous corrections", 3GPP TSG-RAN WG2 Meeting #101bis,, R2-1804572, Samsung, Apr. 16-20, 2018, 65 pages.
"LS Reply on Beam Failure Recovery", 3GPP TSG RAN WG2#101, R2-1803981, RAN1, Feb. 26-Mar. 2, 2018, 2 pages.
"3rd Generation Partnership Project; Technical Specification Group Radio Access Network; NR; Physical layer procedures for control (Release 15)", 3GPP TS 38.213, V15.0.0, Dec. 2017, pp. 1-56.
"Summary of Email Discussion on Beam Failure Recovery on Scell", 3GPP TSG RAN WG1 Meeting #92, R1-1803397, Agenda : 7.1.2, CATT, Feb. 26-Mar. 2, 2018, 3 pages.
International Search Report and Written Opinion received for corresponding Patent Cooperation Treaty Application No. PCT/CN2018/083097, dated Dec. 28, 2018, 9 pages.
"Remaining Issue for Beam Failure Recovery", 3GPP TSG-RAN WG2 Ad Hoc, R2-1800632, Agenda : 10.2.2.1, Huawei, Jan. 22-26, 2018, 4 pages.
"Regarding Aperiodic lindications from Beam Failure Recovery to Assist RLF", 3GPP TSG-RAN WG2 2018 RAN2 Ad-hoc Meeting, R2-1801413, Agenda : 10.2.8, Samsung, Jan. 21-25, 2018, 5 pages.
"On Beam Failure Recovery Procedure", 3GPP TSG RAN WG1 Meeting #90, R1-1712839, Agenda : 6.1.2.2.7, vivo, Aug. 21-25, 2017, 5 pages.
Tentative rejection received for corresponding Taiwan Patent Application No. 108108009, dated Nov. 6, 2019, 27 pages of office action and no pages of Translation available.
"Impact of Beam Failure Recovery on RLF Related Actions", 3GPP TSG RAN WG2 Meeting #101, R2-1802071, Agenda : 10.2.8, Nokia, Feb. 26-Mar. 2, 2018, 4 pages.
"3rd Generation Partnership Project; Technical Specification Group Radio Access Network; NR; Medium Access Control (MAC) protocol specification (Release 15)", 3GPP TS 38.321, V15.1.0, Mar. 2018, pp. 1-67.
"3rd Generation Partnership Project; Technical Specification Group Radio Access Network; NR; Radio Resource Control (RRC) protocol specification (Release 15)", 3GPP TS 38.331, V15.7.0, Sep. 2019, pp. 1-527.
Extended European Search Report corresponding to EP Application No. 18914797.8, dated Oct. 28, 2021.
Mediatek Inc., "Remaining Issues on Beam Failure Recovery", 3GPP TSG RAN WG1 Meeting #92bis, Sanya, China, Apr. 16-20, 2018, R1-1804059, 5 pages.
Japanese Office Action corresponding to JP Application No. 2020-555907, dated Jan. 18, 2022.
Lenovo et al., "Discussion of beam failure recovery for carrier aggregation", 3GPP TSG RAN WG1 Meeting #92, Sanya, China, Apr. 16-20, 2018, R1-1804211, 6 pages.
Huawei et al., "Discussion on RA for SCells BFR", 3GPP TSG-RAN WG2 Meeting 102, Sanya, China, Apr. 16-20, 2018, R2-1805905, 8 pages.

* cited by examiner

CELL GROUPING FOR BEAM MANAGEMENT

RELATED APPLICATION

This application was originally filed as PCT Application No. PCT/CN2018/083097 on Apr. 13, 2018, which is hereby incorporated in its entirety.

BACKGROUND

Field

Certain embodiments may relate to wireless communication systems, for example, some embodiments may relate to beamforming techniques.

Description of the Related Art

A random access channel (RACH) procedure, which may include contention-free random access (CFRA) and contention-based random access (CBRA), may be initiated by user equipment for beam failure recovery procedures on a primary cell. However, challenges exist where beam failure recovery techniques do not function with secondary serving cells. For example, secondary serving cells that are not co-located with a primary serving cell may falsely complete a beam failure recovery procedure. Thus, a need exists for beam failure recovery procedures that operate with both a primary serving cell and secondary serving cells.

SUMMARY

In accordance with an embodiment, a method may include determining, by user equipment, a beam management group comprising one or more serving cells. The method may further include detecting, by the user equipment, a beam failure on at least one serving cell of the beam management group. The method may further include transmitting, by the user equipment, a beam failure recovery request to the at least one serving cell of the beam management group. The method may further include, in response to receiving a beam failure recovery response from the at least one serving cell of the beam management group via a physical downlink control channel, terminating, by the user equipment, a beam failure recovery procedure for each of the one or more serving cells of the beam management group.

In accordance with an embodiment, an apparatus may include at least one processor and at least one memory including computer program code. The at least one memory and the computer program code may be configured to, with the at least one processor, cause the apparatus to at least determine a beam management group comprising one or more serving cells. The at least one memory and the computer program code may be further configured to, with the at least one processor, cause the apparatus to at least detect a beam failure on at least one serving cell of the beam management group. The at least one memory and the computer program code may be further configured to, with the at least one processor, cause the apparatus to at least transmit a beam failure recovery request to the at least one serving cell of the beam management group. The at least one memory and the computer program code may be further configured to, with the at least one processor, cause the apparatus to at least, in response to receiving a beam failure recovery response from the at least one serving cell of the beam management group via a physical downlink control channel, terminate a beam failure recovery procedure for each of the one or more serving cells of the beam management group.

In accordance with an embodiment, an apparatus may include means for determining a beam management group comprising one or more serving cells. The apparatus may further include means for detecting a beam failure on at least one serving cell of the beam management group. The apparatus may further include means for transmitting a beam failure recovery request to the at least one serving cell of the beam management group. The apparatus may further include means for, in response to receiving a beam failure recovery response from the at least one serving cell of the beam management group via a physical downlink control channel, terminating, by the user equipment, a beam failure recovery procedure for each of the one or more serving cells of the beam management group.

A non-transitory computer readable medium may, in certain embodiments, be encoded with instructions that, when executed in hardware, perform a process. The process may include a method for determining, by user equipment, a beam management group comprising one or more serving cells. The process may further include a method for detecting, by the user equipment, a beam failure on at least one serving cell of the beam management group. The process may further include a method for transmitting, by the user equipment, a beam failure recovery request to the at least one serving cell of the beam management group. The process may further include a method for, in response to receiving a beam failure recovery response from the at least one serving cell of the beam management group via a physical downlink control channel, terminating, by the user equipment, a beam failure recovery procedure for each of the one or more serving cells of the beam management group.

A computer program product may, according to certain embodiments, encode instructions for performing a process. The process may include a method that can determine a beam management group comprising one or more serving cells. The process may further include a method that can detect a beam failure on at least one serving cell of the beam management group. The process may further include a method that can transmit a beam failure recovery request to the at least one serving cell of the beam management group. The process may further include a method that can, in response to receiving a beam failure recovery response from the at least one serving cell of the beam management group via a physical downlink control channel, terminate a beam failure recovery procedure for each of the one or more serving cells of the beam management group.

An apparatus, according to certain embodiments, may include circuitry for determining, by user equipment, a beam management group comprising one or more serving cells. The apparatus may also include circuitry for detecting, by the user equipment, a beam failure on at least one serving cell of the beam management group. The apparatus may also include circuitry for transmitting, by the user equipment, a beam failure recovery request to the at least one serving cell of the beam management group. The apparatus may also include circuitry for, in response to receiving a beam failure recovery response from the at least one serving cell of the beam management group via a physical downlink control channel, terminating, by the user equipment, a beam failure recovery procedure for each of the one or more serving cells of the beam management group.

In accordance with an embodiment, a method may include receiving, by a serving cell of a plurality of serving cells, a beam failure recovery request from user equipment. The method may further include transmitting, by the serving cell, via a physical downlink control channel, one or more beam failure recovery responses to the user equipment. The one or more beam failure recovery responses instructs the user equipment to terminate a beam failure recovery procedure for each of the one or more serving cells in response to receiving the one or more beam failure recovery responses.

In accordance with an embodiment, an apparatus may include at least one processor and at least one memory including computer program code. The at least one memory and the computer program code may be configured to, with the at least one processor, cause the apparatus to at least receive a beam failure recovery request from user equipment. The at least one memory and the computer program code may be further configured to, with the at least one processor, cause the apparatus to at least transmit, via a physical downlink control channel, one or more beam failure recovery responses to the user equipment. The one or more beam failure recovery responses instruct the user equipment to terminate a beam failure recovery procedure for each of the one or more serving cells in response to receiving the one or more beam failure recovery responses.

In accordance with an embodiment, an apparatus may include means for receiving, by a serving cell of a plurality of serving cells, a beam failure recovery request from user equipment. The apparatus may further include means for transmitting, by the serving cell, via a physical downlink control channel, one or more beam failure recovery responses to the user equipment. The one or more beam failure recovery responses instruct the user equipment to terminate a beam failure recovery procedure for each of the one or more serving cells in response to receiving the one or more beam failure recovery responses.

A non-transitory computer readable medium may, in certain embodiments, be encoded with instructions that, when executed in hardware, perform a process. The process may include a method for receiving, by a serving cell of a plurality of serving cells, a beam failure recovery request from user equipment. The process may further include a method for transmitting, by the serving cell, via a physical downlink control channel, one or more beam failure recovery responses to the user equipment. The one or more beam failure recovery responses instruct the user equipment to terminate a beam failure recovery procedure for each of the one or more serving cells in response to receiving the one or more beam failure recovery responses.

A computer program product may, according to certain embodiments, encode instructions for performing a process. The process may include a method that can receive a beam failure recovery request from user equipment. The process may further include a method that can transmit, via a physical downlink control channel, one or more beam failure recovery responses to the user equipment. The one or more beam failure recovery responses instruct the user equipment to terminate a beam failure recovery procedure for each of the one or more serving cells in response to receiving the one or more beam failure recovery responses.

An apparatus, according to certain embodiments, may include circuitry for receiving, by a serving cell of a plurality of serving cells, a beam failure recovery request from user equipment. The apparatus may also include circuitry for transmitting, via a physical downlink control channel, one or more beam failure recovery responses to the user equipment. The one or more beam failure recovery responses instruct the user equipment to terminate a beam failure recovery procedure for each of the one or more serving cells in response to receiving the one or more beam failure recovery responses.

BRIEF DESCRIPTION OF THE DRAWINGS

For proper understanding of this disclosure, reference should be made to the accompanying drawings, wherein.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments. Some embodiments discussed below relate to LTE 5th generation, but other embodiments may relate to LTE-A, LTE 4th generation, Internet of Things (IoT), and new radio (NR).

Figure 1:
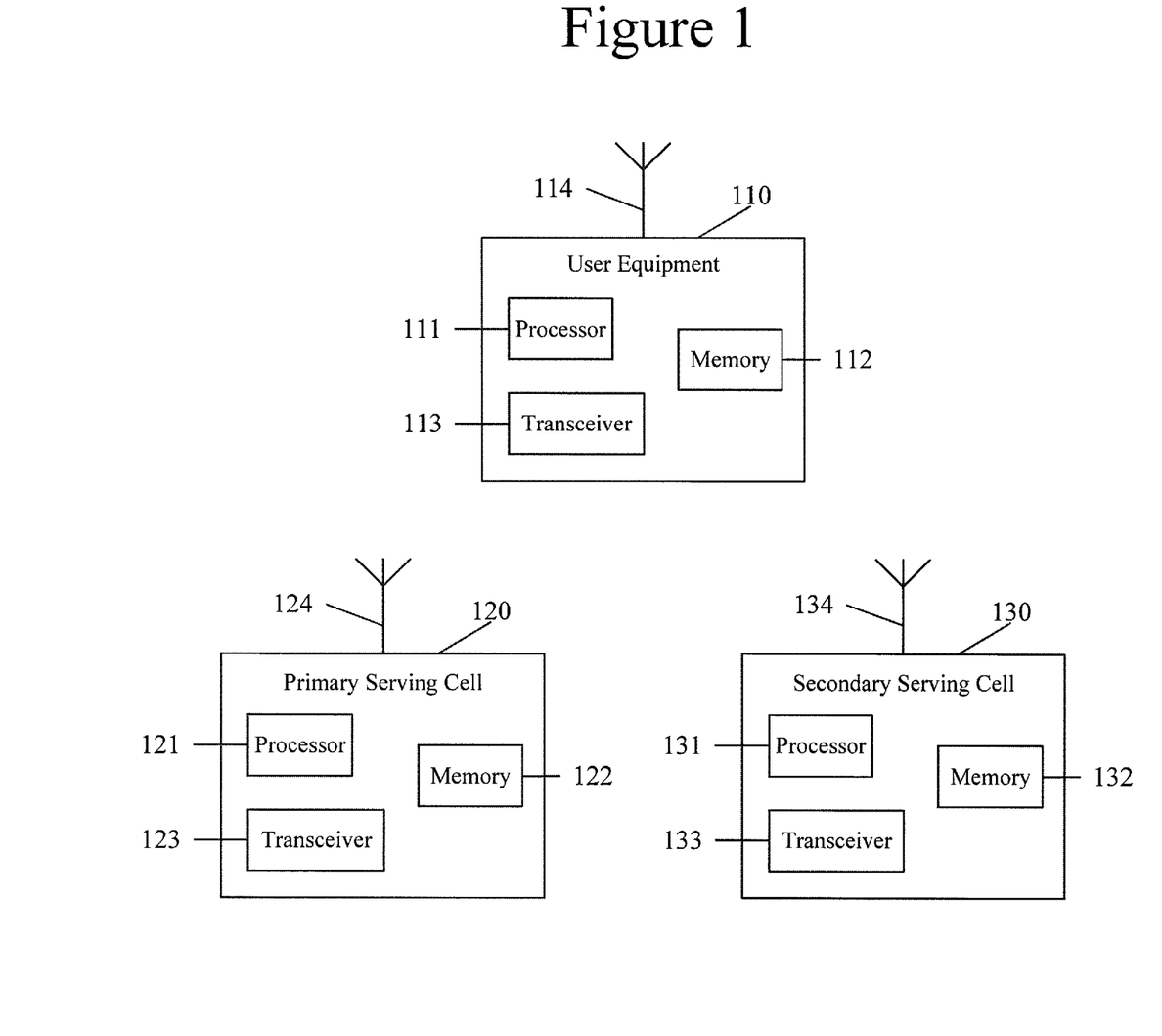
FIG. 1 illustrates an example of a system according to certain embodiments.

FIG. 1 illustrates a system according to certain embodiments. In one embodiment, a system may include multiple devices, such as, for example, one or more user equipment (UE) 110, primary serving cell 120, and one or more secondary serving cells 130. UE 110 may include a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Primary serving cell 120 and secondary serving cell 130 may be a base station, such as an evolved node B (eNB) or next generation node B (gNB), a next generation radio access network (NG RAN), a mobility management entity (MME), a serving gateway, a server, and/or any other access node or combination thereof. Furthermore, a citizens broadband radio service (CBRS) device (CBSD) may include a user device, such as UE 110, and/or a serving cell, such as primary serving cell 120 and secondary serving cell 130.

Devices 110, 120, and 130 may include at least one processor, respectively indicated as 111, 121, and 131, and at least one memory indicated as 112, 122, and 132. The memory may be fixed or removable. The memory may include computer program instructions or computer code contained therein. Processors 111, 121, and 131 and memory 112, 122, and 132, or a subset thereof, may be configured to provide means corresponding to the various blocks of FIGS. 2-6. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceivers 113, 123, and 133 may be provided, and the devices may also include at least one antenna, respectively illustrated as 114, 124, and 134. The device may have many antennas, such as an array of antennas configured for multiple input multiple output (MIMO) communications, or multiple antennas for multiple radio access technologies. Other configurations of these devices, for example, may be provided.

Transceivers 113, 123, and 133 may be a transmitter, a receiver, or both a transmitter and a receiver, or a unit or device that may be configured both for transmission and reception.

Processor 111, 121, and 131 may be embodied by any computational or data processing device, such as a central processing unit (CPU), application specific integrated circuit (ASIC), or comparable device. The processors may be implemented as a single controller, or a plurality of controllers or processors.

Memory 112, 122, and 132 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the processor. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment to perform any of the processes described below (see, for example, FIGS. 2-6). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 2-6. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Figure 2:
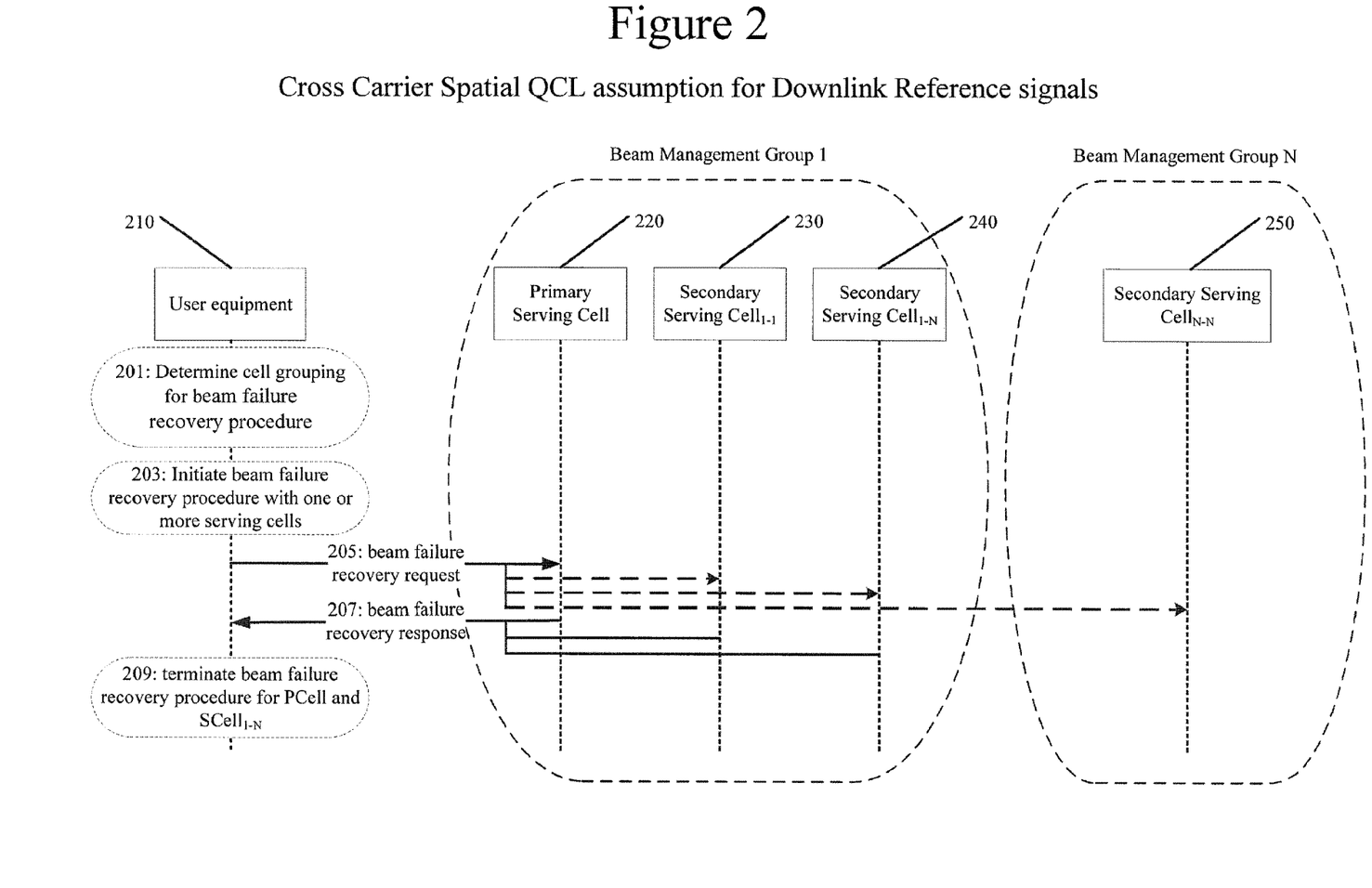
FIG. 2 illustrates a signal flow diagram according to certain embodiments.

FIG. 2 illustrates signaling between user equipment 210, such as user device 110, primary serving cell 220, such as primary serving cell 120, and secondary serving cells 230, 240, and 250, such as secondary serving cell 130. In some embodiments, one or more of the serving cells may be grouped into one or more beam management groups. For example, in FIG. 2, beam management group 1 may include a primary serving cell and one or more secondary serving cells $G_{1(1-N)}$, while beam management group N may include one or more secondary serving cells $G_{N(1-N)}$. In some embodiments, a beam management group may include a primary serving cell and one or more secondary serving cells. In some embodiments, a beam management group may include only one or more secondary serving cells. In some embodiments, a beam management group may include a primary serving cell only. In step 201, user equipment 210 may determine a cell grouping for beam failure recovery procedure. In step 203, user equipment 210 may initiate a beam failure recovery procedure for one or more serving cells associated with one or more beam management groups. For example, user equipment 210 may initiate a beam failure recovery procedure for one or more serving cells in beam management group 1, such as primary serving cell 220 and one or more secondary serving cells 1-N, in case beam failure is detected in beam management group 1. In another example, user equipment 210 may initiate a beam failure recovery procedure for one or more serving cells in beam management group N, such as secondary serving cell N-N, in case beam failure is detected in beam management group N. In step 205, user equipment 210 may transmit a beam failure recovery request to at least one serving cell. For example, user equipment 210 may transmit a beam failure recovery request to primary serving cell 220 and/or one or more secondary serving cells 1-N in beam management group 1, and/or secondary serving cell N-N in beam management group N. In step 207, primary serving cell 220 and/or one or more secondary serving cells 1-N may transmit one or more beam failure recovery responses to user equipment 210. In some embodiments, one or more serving cells within a beam management group may be configured with beam failure detection monitoring capabilities. In step 209, user equipment 210 may terminate the beam failure recovery procedure for each of primary serving cell 220 and secondary serving cells 1-N that are associated with the beam management group that the serving cell which received the beam failure recovery request belongs. In some embodiments, the terminating of step 207 may be performed in response to receiving the beam failure recovery response, where the beam failure recovery response is received from a primary serving cell and/or at least one of the secondary serving cells 1-N that are associated with the beam management group that the serving cell which received the beam failure recovery request belongs. In some embodiment, a beam failure recover request may be a random access preamble (contention-free/dedicated or contention based) based request used in random access procedure. In some embodiments, a beam failure recovery request may be a MAC CE based request. The MAC CE based request may be sent to at least one of the beam management groups where the failure was not detected.

In certain embodiments, user equipment 210 may terminate the beam failure recovery procedure for each serving cell that is associated with the beam management group that the serving cell for which beam failure was detected and/or for which the beam failure recovery request was transmitted. For example, primary serving cell 220 and any number of secondary serving cells 1-N may be associated with one or more beam management groups, for example, a first beam management group and a second beam management group, where the one or more serving cells associated with a beam management group share one or more characteristics. For example, the beam management group may be defined as one or more serving cells that share one or more common transmission configuration index (TCI) states for physical downlink control channels (PDCCH), one or more timing advance groups (TAGs), and/or one or more common beam failure detection reference signals (BFD-RSs). In some embodiments, an active TCI state for PDCCH may indicate a downlink reference signal that is quasi co-located (QCL) with the PDCCH demodulation reference signal (DMRS), for example, a downlink reference signal corresponding to the beam used for PDCCH. In some embodiments, user equipment may have multiple configured TCI states where at least one is active, for example, the state is indicated for PDCCH. In some embodiments, QCL parameters may include delay spread, Doppler spread, Doppler shift, average delay, and/or spatial Rx parameters. In some embodiments, a beam may be identified by a downlink reference signal, such as a SS/PBCH block and/or CSI-RS. In certain embodiments, the common BFD-RSs may be downlink reference signals (such as SS/PBCH block and/or CSI-RS) that may be defined by networks, or alternatively or in addition to, may be generated by the user equipment. BFD-RS may be referred with an identifier or index, such as CSI-RS resource (or resource set) indicator/index and/or SS/PBCH time location index. In some embodiments, one or more beam management groups may be defined by explicit radio resource control (RRC) signaling and/or one or more TAGs.

In certain embodiments, a primary serving cell within the beam management group may be the default failure detection cell of the beam management group. In some embodiments, wherein a beam management group (first, second or Nth) has a plurality of secondary serving cells, at least one secondary serving cell is configured as failure detection cell explicitly by network. Explicit configuration may override the implicit configuration of failure detection cell. If no explicit configuration is signaled to UE, UE may use implicit configuration. In some embodiments, in more general view, if the beam management group comprises of at least two serving cells, network may configure the failure detection cell explicitly via RRC or RRC+MAC signaling. In some embodiments, the beam management group may have a plurality of secondary serving cells, where each of the plurality of secondary serving cells may be associated with a TCI state (TCI is cell-specific, and multiple serving cells may be configured with the same TCI state for PDCCH, where the TCI states for PDCCH (DL RS corresponding to PDCCH beam) across the serving cells share spatial transmission characteristics), and the secondary serving cell associated with the lowest SCellIndex (if a PCell is one of the cells in the beam management group, this may be implicitly assumed as the default failure detection cell i.e. assumed without explicit indication or configuration by network) among the plurality of secondary serving cells may be a default failure detection cell of the beam management group. In some embodiments, the set of serving cells in a beam management group may share the BFD-RS configuration. For example, BFD-RS may be configured implicitly (based on TCI state for PDCCH) or explicitly by assigning set of resources to be used for failure detection. Techniques in this invention can also be applied for radio link monitoring, for example, alternatively or additionally to BFD-RS configuration the RLM-RS (a list of DL RS) can be used. In some embodiments, the same grouping as for beam management purposes may be used for radio link monitoring.

Figure 3:
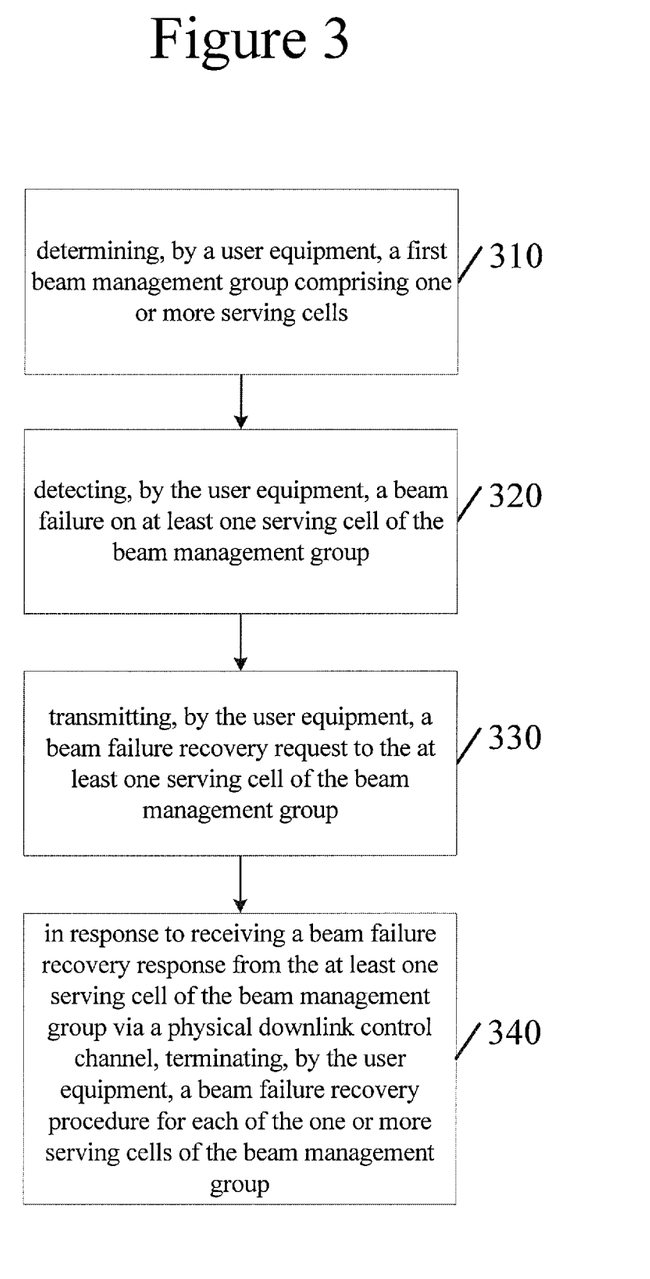
FIG. 3 illustrates an example of a method performed by user equipment according to certain embodiments.

FIG. 3 illustrates an example method of user equipment performing a beam failure recovery procedure associated with a beam management group. In step 310, the user equipment may determine a beam management group comprising one or more serving cells. In some embodiments, the one or more serving cells may be one or more of a primary serving cell and one or more secondary serving cells.

In certain embodiments, the one or more serving cells may be associated with one or more beam management groups, for example, a first beam management group and a second beam management group, where the one or more serving cells associated with a beam management group share one or more characteristics. For example, the beam management group may be defined as one or more serving cells that share one or more common TCI state PDCCHs, one or more TAGs, and/or one or more common BFD-RSs. In certain embodiments, the one or more common BFD-RSs may be downlink reference signals that may be defined by networks, or alternatively or in addition to, may be generated by the user equipment. In some embodiments, one or more beam management groups may be defined by RRC signaling and/or TAGs.

In certain embodiments, a primary serving cell within the beam management group may be a default/implicitly assumed (i.e. assumed without explicit indication or configuration) failure detection cell of the beam management group. In some embodiments, the second beam management group may have a plurality of secondary serving cells, such as a plurality of secondary cell but no primary cell, where each of the plurality of secondary serving cells may be associated with a TCI state for PDCCH (of BFD-RS or by explicit configuration by network), and the serving cell associated with the lowest index, such as a SCellIndex, among the plurality of secondary serving cells may be a default/implicitly assumed (i.e. assumed without explicit indication or configuration) failure detection cell of the second beam management group.

In certain embodiments, the one or more serving cells associated with the beam management group may change over time, where one or more serving cells may be added or may be removed from the beam management group. In some embodiments, a beam management group may have characteristics requirements for a serving cell to associate with the beam management group. For example, the characteristics requirements may be static and/or may change over time. In various embodiments, the beam management group may be defined at a first time by one or more serving cells that share one or more common TCI state PDCCHs, and may be defined at a second time by one or more serving cells that share a common beam failure detection reference signal. In various embodiments, the beam management group may be defined at a first time by one or more serving cells that share a common beam failure detection reference signal, and may be defined at a second time by one or more serving cells that share one or more common TCI state PDCCHs. In some embodiments, the beam management groups (or radio link monitoring groups) may be explicitly configured by a network using RRC and/or RRC+MAC signaling. In some embodiments, one or more serving cells may be removed from the beam management group that no longer possess the characteristics required by the beam management group, and/or added that satisfy the characteristics required by the beam management group.

In step 320, the user equipment may detect a beam failure on at least one serving cell of the beam management group. In step 330, the user equipment may detect a beam failure on at least one serving cell of the beam management group.

In step 340, in response to receiving at least one beam failure recovery response, the user equipment may terminate the beam failure recovery procedure for each of the one or more serving cells associated with the beam management group. In some embodiments, the user equipment may not perform beam failure recovery procedure termination for one or more of the serving cells associated with the beam management group if some predefined conditions apply. In some embodiments, the beam failure recovery response may be a physical downlink control channel addressed to the cell radio network temporary identifier associated with the user equipment from one of the serving cells within the beam management group. In some embodiments, the beam recovery failure recovery response is a physical downlink control channel addressed to a cell radio network temporary identifier of user equipment from the serving cell where the beam recover request is sent. The physical downlink control channel addressed to a cell radio network temporary identifier of user equipment may comprise at least one of an uplink grant or downlink assignment. This may precede of MAC entity receiving notification of a physical downlink control channel transmission from lower layers.

Figure 4:
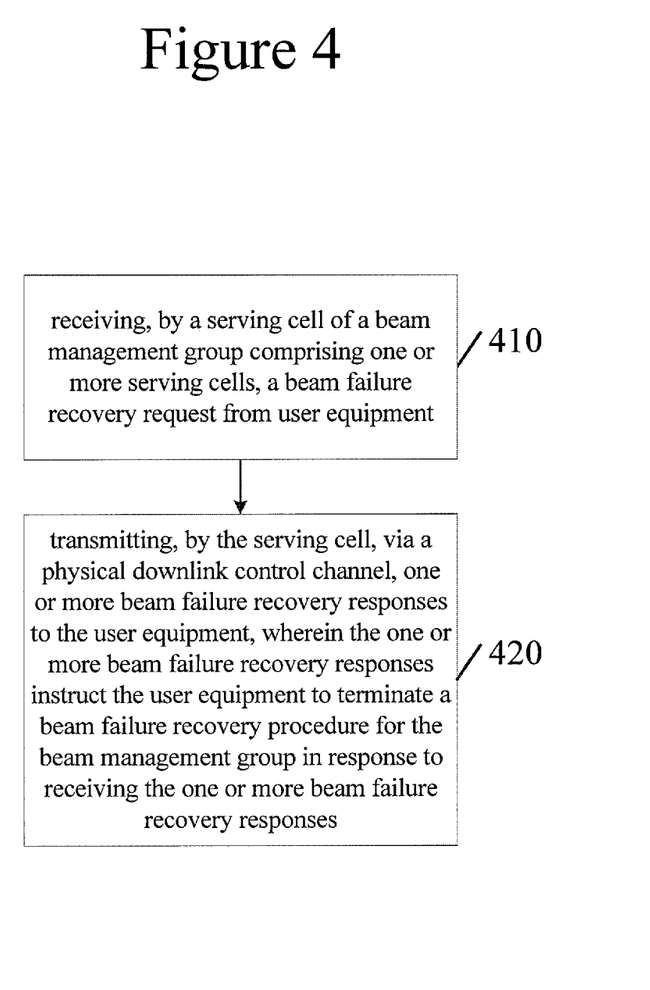
FIG. 4 illustrates an example of a method performed by a serving cell according to certain embodiments.

FIG. 4 illustrates an example method of a serving cell performing a beam failure recovery procedure associated with a beam management group comprising one or more serving cells. In step 410, a serving cell may receive a beam failure recovery request from user equipment. In some embodiments, the one or more serving cells may be one or more of a primary serving cell and one or more secondary serving cells.

In certain embodiments, the serving cell may be associated with one or more beam management groups, for example, a first beam management group and a second beam management group, where the serving cells associated with a beam management group share one or more characteristics. For example, the beam management group may be defined as one or more serving cells that share one or more common TCI state PDCCHs, one or more common TAGs, and/or one or more common BFD-RSs. In certain embodiments, the common BFD-RSs may be downlink reference signals that may be defined by networks or may be generated by the user equipment. In some embodiments, the beam management group may be defined by explicit RRC signaling and/or RRC+MAC signaling.

In certain embodiments, the one or more serving cells associated with the beam management group may change over time, where one or more serving cells may be added or may be removed from the beam management group. In some embodiments, a beam management group may have characteristics requirements for a serving cell to associate with the beam management group. For example, the characteristics requirements may or may not change over time. In various embodiments, the beam management group may be defined at a first time by one or more serving cells that share a common TCI state PDCCH, for example, a the downlink RS corresponding to PDCCH beam, and may be defined at a second time by one or more serving cells that share a common beam failure detection reference signal. In various embodiments, the beam management group may be defined at a first time by one or more serving cells that share a common beam failure detection reference signal, and may be defined at a second time by one or more serving cells that share one or more common TCI PDCCHs. In some embodiments, one or more serving cells may be removed from the beam management group that no longer possess the characteristics required by the beam management group, and/or added that satisfy the characteristics required by the beam management group.

In step 420, the serving cell may transmit at least one beam failure recovery response to the user equipment. In some embodiments, the beam failure recovery response may instruct the user equipment to terminate a beam failure recovery procedure for each of the one or more serving cells of the beam management group.

Figure 5:
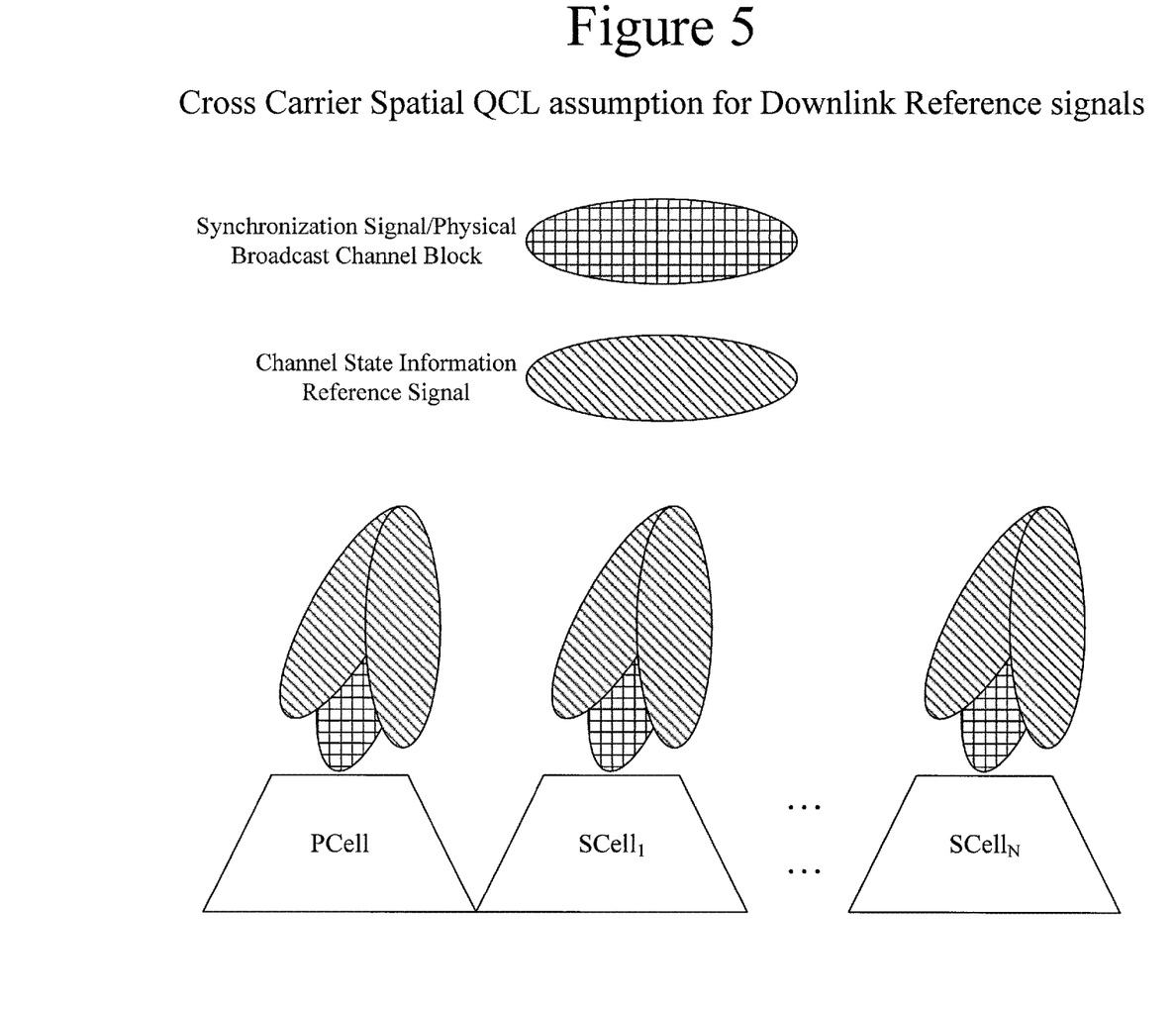
FIG. 5 illustrates techniques in using downlink reference signals for beam failure detection and recovery with a single beam management group.

FIG. 5 illustrates a system with a primary serving cell and one or more secondary serving cells in a single beam management group. In particular, FIG. 5 illustrates the use of cross-carrier, spatial quasi co-location techniques in using downlink reference signals for beam failure detection and recovery. In some embodiments, the downlink reference signals may be one or more channel state information reference signals (CSI-RS), one or more physical broadcast channel (PBCH) blocks, and/or one or more synchronization signal (SS) blocks. The downlink reference signals may be transmitted by a primary serving cell and/or one or more secondary serving cells. In some embodiments, a beam management group may comprise a primary serving cell and/or one or more secondary serving cells. For example, the beam management group illustrated in FIG. 5 includes a primary serving cell (PCell), and 1-N secondary serving cells (SCell$_{1-N}$). In other embodiments, the number of primary serving cells and secondary serving cells contained in a beam management group may vary.

Figure 6:
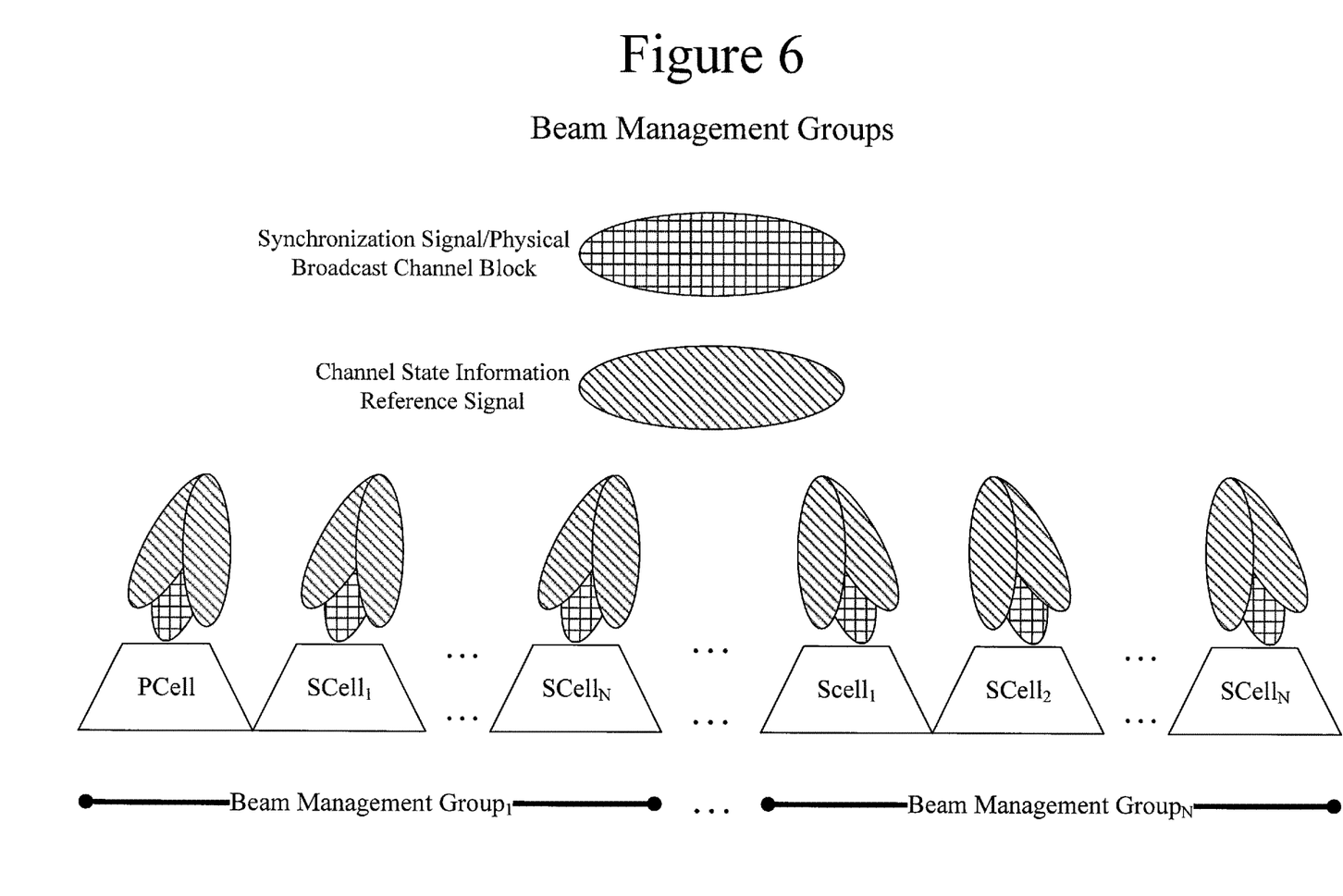
FIG. 6 illustrates techniques in using downlink reference signals for beam failure detection and recovery with multiple beam management groups.

FIG. 6 illustrates a system with at least one beam management group. Specifically, a first beam management group may have a PCell and one or more SCell$_{1-N}$, while a second beam management group may have no PCell but one or more SCell$_{1-N}$. In some embodiments, the downlink reference signals may be one or more channel state information reference signals (CSI-RS), one or more synchronization signal/physical broadcast channel (SS/PBCH) blocks, block index, or block time location index. The downlink reference signals may be transmitted by a primary serving cell and/or one or more secondary serving cells. In some embodiments, a beam management group may comprise a primary serving cell and/or one or more secondary serving cells.

Certain embodiments of the present invention may have various benefits and/or advantages. For example, certain embodiments are directed to improvements in computer-related technology, specifically, by avoiding performing beam failure recovery for multiple serving cells, as well as avoiding terminating beam failure recovery procedures based upon false reference signals.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

Partial Glossary

3GPP 3rd Generation Partnership Project
BFD-RS Beam Failure Detection Reference Signal
BFR Beam Failure Recovery
BFRQ Beam Failure Recovery Query BFRR Beam Failure Recovery Request
BMG Beam Management Group
CA Carrier Aggregation
CBRA Contention Based Random Access
CCS Cross Carrier Scheduling
CE Coverage Enhancement
CFRA Contention Free Random Access
CIF Carrier Indicator Field
C-RNTI Cell-Radio Network Temporary Identifier
CSI-RS Channel State Information Reference Signal
DCI Downlink Control Information
DL Downlink
DMRS Demodulation Reference Signal
E-UTRAN Evolved UMTS Terrestrial Radio Access Network
HARQ Hybrid Automatic Repeat Request
MAC Medium Access Control
NAS Non-Access Stratum
NR New Radio
NW Network
PBCH Physical Broadcast Channel
PCC Primary Component Carrier
PCell Primary Cell
PDCCH Physical Downlink Control Channel
PUCCH Physical Uplink Control Channel
QCL Quasi co-location
RA Random Access
RACH Random Access Channel
RAN4 Radio Access Network Working Group 4
RAT Radio Access Technology
RB Resource Block
RNTI Radio Network Temporary Identifier
RRC Radio Resource Control
RRH Remote Radio Head
RS Reference Signal
SCell Secondary Cell
SS Synchronization Signal
PSS Primary Synchronization Signal
SSS Secondary Synchronization Signal
TAG Timing Advance Group
TCI Transmission Configuration Index
UE User Equipment
UL Uplink
UMTS Universal Mobile Telecommunications System

What is claimed is:

1. An apparatus including at least one processor and at least one memory including computer program code, the at least one memory and the computer program code being configured to, with the at least one processor, cause the apparatus to at least:
    determine a beam management group comprising one or more serving cells;
    detect a beam failure on at least one serving cell of the beam management group; and
    transmit a beam failure recovery request to at least one serving cell, wherein the at least one memory and the computer program code are further configured to, with the at least one processor, cause the apparatus to:
    in response to receiving a beam failure recovery response from at least one of the at least one serving cell of the beam management group via a physical downlink control channel, terminate a beam failure recovery procedure for each of the one or more serving cells of the beam management group, wherein
    the beam failure recovery response comprises a physical downlink control channel message addressed to a cell radio network temporary identifier of the apparatus, wherein the response is received from at least one of the at least one serving cell to which the beam recover request was transmitted, and
    wherein the one or more serving cells of the beam management group share a common transmission configuration index state for physical downlink control channel.

2. The apparatus according to claim 1, wherein the one or more serving cells comprise one or more primary serving cells and one or more secondary serving cells.

3. The apparatus according to claim 1, wherein the beam management group is associated with a timing advance group.

4. The apparatus according to claim 1, wherein the beam management group is defined by radio resource control signaling.

5. The apparatus according to claim 1, wherein a primary cell within the beam management group is configured as a failure detection cell of the beam management group.

6. The apparatus according to claim 1, wherein the at least one memory and the computer program code are further configured to, with the at least one processor, cause the apparatus to determine a second beam management group having a plurality of secondary serving cells, and at least one secondary serving cell is configured as a failure detection cell.

7. The apparatus according to claim 1, wherein the apparatus is in communication with one or more serving cells associated with one or more additional beam management groups.

8. An apparatus including at least one processor and at least one memory including computer program code, the at least one memory and the computer program code being configured to, with the at least one processor, cause a serving cell of a beam management group comprising one or more serving cells to at least:
    receive a beam failure recovery request from a user equipment;
    transmit via a physical downlink control channel, one or more beam failure recovery responses to the user equipment, wherein
    the one or more beam failure recovery responses instruct the user equipment to terminate a beam failure recovery procedure for the beam management group or for another beam management group in response to receiving the one or more beam failure recovery responses, and wherein
    the one or more beam failure recovery responses comprise a physical downlink control channel message addressed to the cell radio network temporary identifier associated with the user equipment, and
    wherein the one or more serving cells of the beam management group share a common transmission configuration index state for physical downlink control channel.

9. The apparatus according to claim 8, wherein the one or more serving cells comprise one or more primary serving cells and one or more secondary serving cells.

10. The apparatus according to claim 8, wherein the serving cell of the beam management group additionally associated with at least another beam management group.

11. The apparatus according to claim 8, wherein the beam management group is defined as one or more serving cells that share a common transmission configuration index state for physical downlink control channel.

12. The apparatus according to claim 8, wherein the beam management group is defined as one or more serving cells that share a common beam failure detection reference signal.

13. The apparatus according to claim 8, wherein the beam management group is defined at a first time by one or more serving cells that share a common transmission configuration index state for physical downlink control channel and is defined at a second time by one or more serving cells that share a common beam failure detection reference signal.

14. The apparatus according to claim 8, wherein a primary cell within the beam management group is configured as a failure detection cell of the beam management group.

15. The apparatus according to claim 8, wherein a second beam management group has a plurality of secondary serving cells, and the secondary serving cell associated with the lowest cell index among the secondary serving cell indexes associated with the plurality of secondary serving cells is configured as a failure detection cell.

* * * * *